Figure 1:
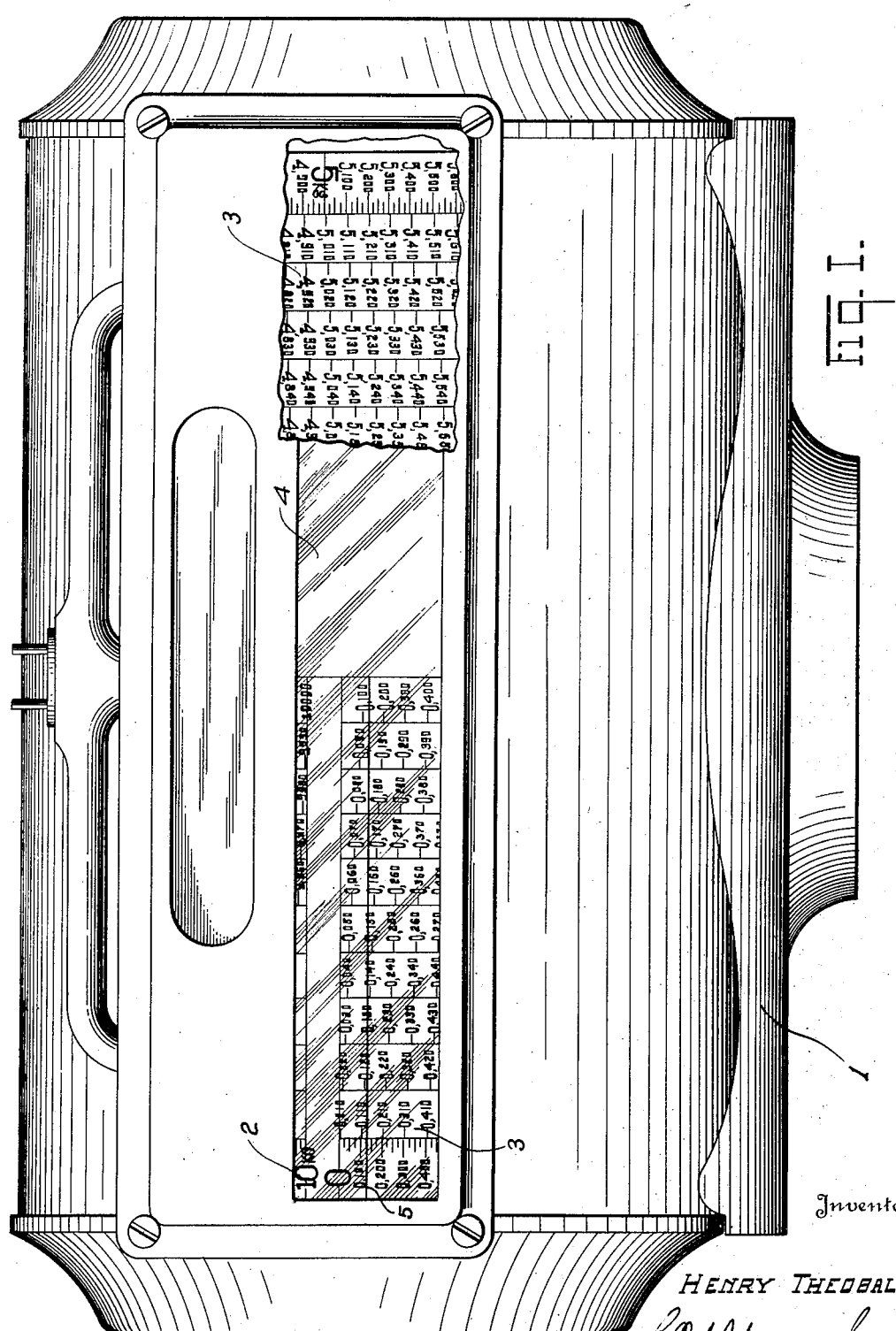

April 6, 1926.

H. THEOBALD

INDICATING DEVICE

Filed August 7, 1922   3 Sheets-Sheet 1

1,579,576

Inventor
HENRY THEOBALD.
B.M.Marshall
Attorney

April 6, 1926.
H. THEOBALD
INDICATING DEVICE
Filed August 7, 1922          3 Sheets-Sheet 2
1,579,576
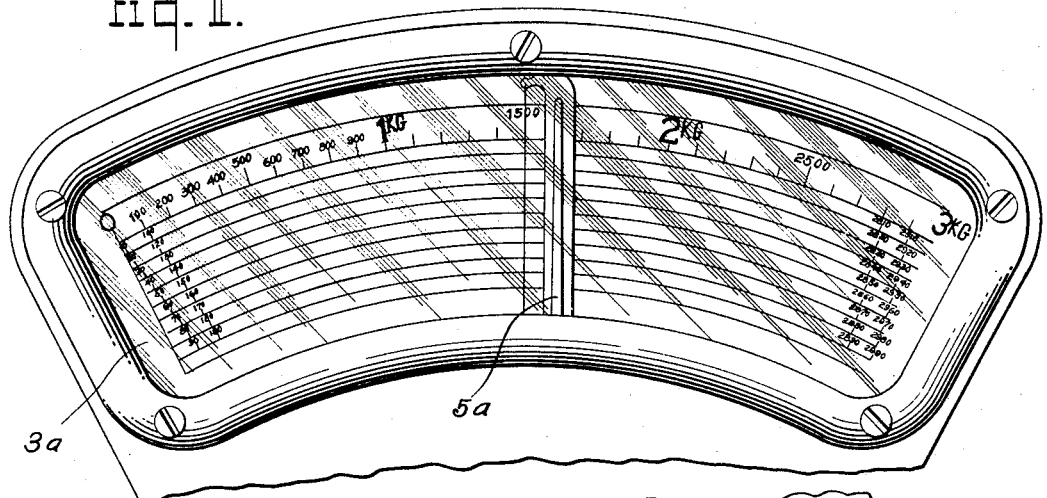
Fig. II.
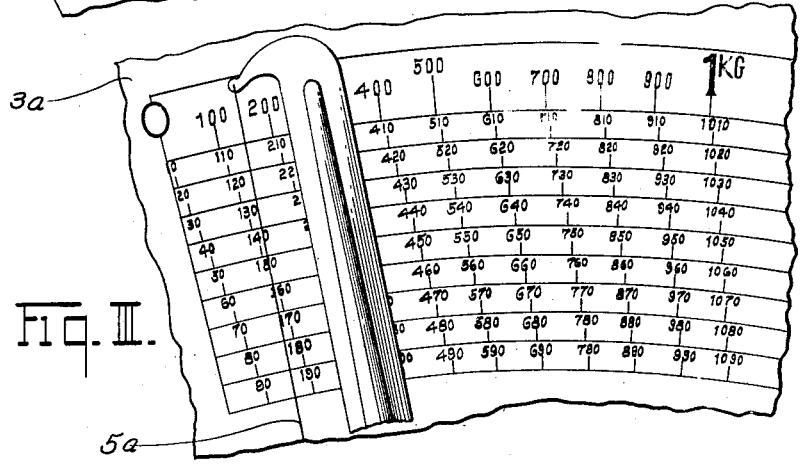
Fig. III.
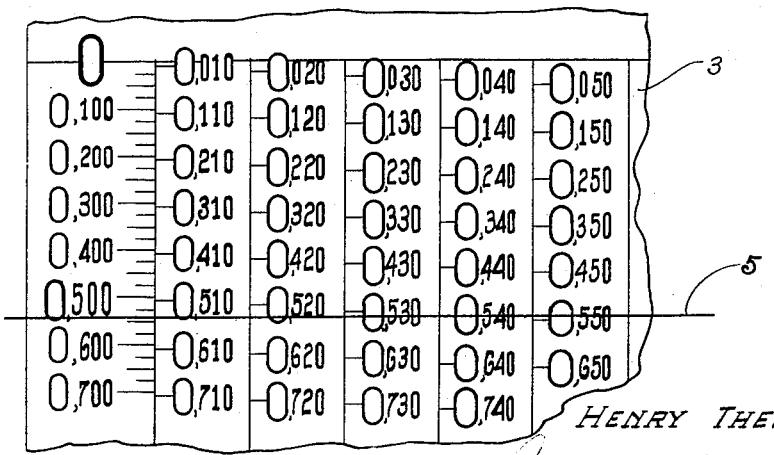
Fig. IV.
Inventor
HENRY THEOBALD.
By D. Marshall
Attorney April 6, 1926.
H. THEOBALD
INDICATING DEVICE
Filed August 7, 1922   3 Sheets-Sheet 3
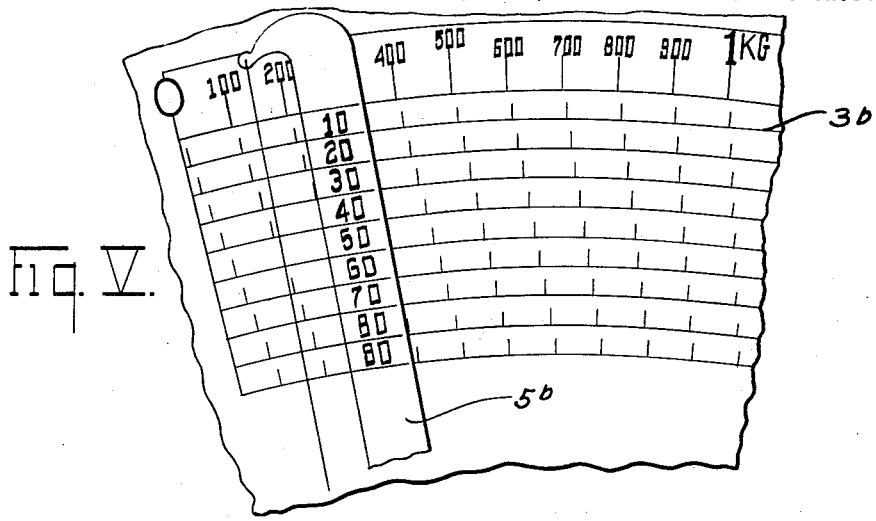
Fig. V.
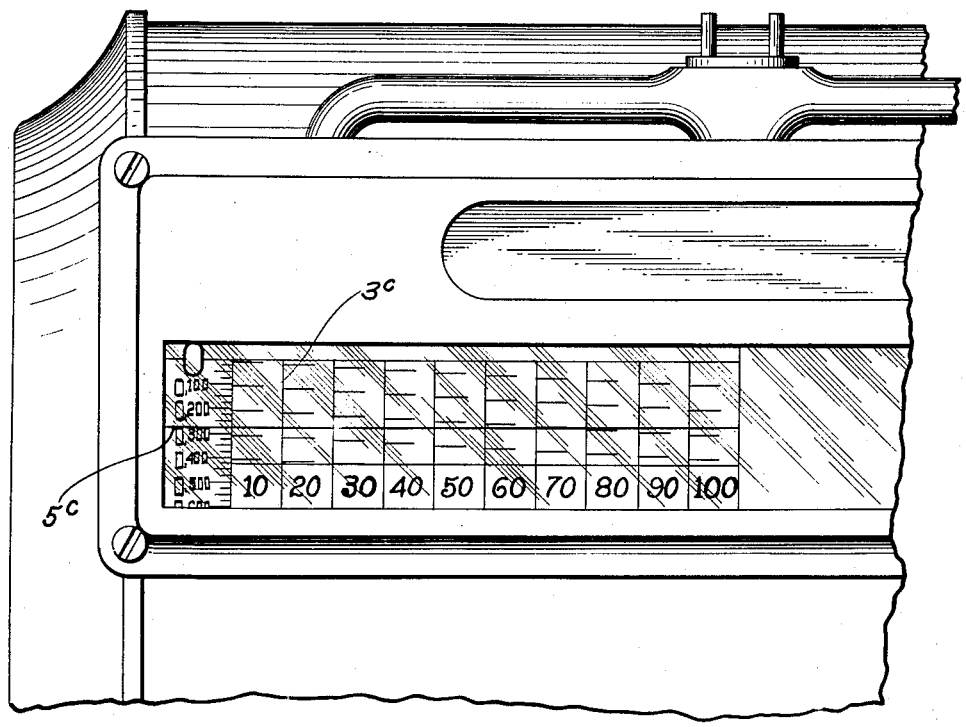
Fig. VI.
Inventor
HENRY THEOBALD.
By
Attorney Patented Apr. 6, 1926.

1,579,576

UNITED STATES PATENT OFFICE.

HENRY THEOBALD, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed August 7, 1922. Serial No. 580,091.

*To all whom it may concern:*

Be it known that I, HENRY THEOBALD, a citizen of the United States, residing at Toledo, in the county of Lucas and State of Ohio, have invented certain new and useful Improvements in Indicating Devices, of which the following is a specification.

This invention relates to indicating devices, and particularly to scale indicators, and one of its principal objects is the provision of a device by means of which slight variations in a force or weight may be clearly and accurately indicated.

Another object of the invention is the provision of an indicator chart having a series of graduations corresponding to slight variations in the force or weight to be indicated, the graduations of the series being nevertheless so positioned on the chart that each graduation stands apart from all the others.

Another object is the provision of an indicating chart bearing a series of graduations corresponding to slightly varying loads, each graduation being provided with a value designating number.

Still another object is the provision of an indicating device having a relatively movable chart and index, wherein a relatively slight movement is sufficient to move the index and any given graduation out of registration and bring the index and a succeeding graduation into registration, the graduations on the chart being nevertheless so positioned that each stands apart from all the others and the indication may, therefore, be readily and accurately read.

Other objects and advantages will be apparent from the following description, in which reference is had to the accompanying drawings illustrating preferred embodiments of my invention and wherein similar reference numerals designate similar parts throughout the several views.

In the drawings:

Figure I is a front elevational view of the chart housing of a scale of the so-called cylinder type, a part of the housing being broken away to show the graduations and figures which are arranged to be viewed from the rear side of the housing;

Figure II is a front elevational view of the upper part of the chart housing of a scale of the so-called fan type, part of the figures on the chart being omitted;

Figure III is an enlarged fragmentary elevational view of the chart and indicator shown in Figure II;

Figure IV is an enlarged elevational view of the chart and indicator shown in Figure I;

Figure V is an enlarged fragmentary elevational view showing a modification of the invention applicable to scales of the fan type; and Figure VI is an enlarged fragmentary elevational view showing a similar modification applicable to scales of the cylinder type.

Referring to the drawings in detail, and particularly to Figures I and IV, the housing 1 may be of any preferred shape, the shape shown being merely exemplary. The window 2 in the front of the housing is arranged to display the left half only of the chart 3, the right half being concealed by the plate 4 or by other means, though the glass of the window may, if desired, extend entirely across the front of the housing for purposes of symmetry.

The housing 1 is provided with a rear window (not shown) which is identical with the window 2, and the figures on the right side of the chart 3 are inverted with respect to the figures on the left side of the chart, so that they are upright as viewed through the window in the rear side of the housing. The zero graduation on the right side of the chart is approximately 180° from the zero graduation on the left side of the chart, so that when the zero graduation on the left side of the chart is visible through the front window of the housing the zero graduation on the right side of the chart is visible through the rear window of the housing. The same is true of other graduations of corresponding values. For instance, when the chart is turned so that the 5 kilo graduation on the left side of the chart is visible through the front window, the 5 kilo graduation on the right side of the chart is visible through the rear window.

Extending horizontally across the front and rear windows are reading lines 5, which are preferably formed by stretching wires or other thin flexible members from side to side of the housing so that they lie in juxtaposition to the surface of the chart. These reading wires form the indices with which the proper graduations of the charts are brought into registration when the chart is in indicating position.

As shown on the drawings, the surface of the chart is divided into a plurality of peripheral strips, each one of which contains a row of graduations. The graduations in the row at the left of the chart are arranged in the usual order, the series beginning at zero, and there being a graduation for every 25 grams and a figure for every 100 grams. The first graduation in the adjacent or second row is in the 10 gram position and is numbered "0.010" while the first graduation in the third row is in the 20 gram position and is numbered "0.020"; the first graduation in the fourth row is in the 30 gram position and is numbered "0.030", and so on, the first graduation in the eleventh row being in the 100 gram position directly in line with the 100 gram graduation in the first row. The graduations from 110 to 200, from 210 to 300, and so forth around the chart are similarly arranged. Being thus arranged in echelon, each graduation is in comparative isolation and there is room on the adjacent chart surface for an appropriate designating number.

As shown in Figure IV, the index is in registration with the graduation designated 540 grams. Since each graduation stands alone, it is easy to determine whether or not it is in registration with the index. In reading the indication it is at once apparent that the line is between the "0.500" and the "0.600" graduations in the row at the left of the chart. As the eye follows the index to the right it falls upon the registering graduation designated "0.540" and the exact weight on the scale is thus clearly and immediately apparent. There is no possibility of confusion in reading, such as may occur if the graduations are too closely set or if it is necessary for the eye to rove to the designating number of a lower or higher graduation in order that the value of the registering graduation may be determined.

By the above described combination of a reading line with a chart having graduations in stepped formation, I am able to obtain a reading which has all the accuracy of a reading obtained from a vernier without the confusion and errors of parallax that would be incident to the employment of a plurality of indices such as are employed in the vernier. Because of the fact that only one reading line is employed in my device, the indication may be read with approximately the same ease and quickness as the widely spaced graduations ordinarily employed upon charts of weighing scales and similar devices.

The laws of many States and of many foreign countries require a clear interval of a definite fraction of a millimeter between adjacent graduations. This requirement is made in order that the charts of weighing scales may be clearly readable to all persons by whom they are likely to be used, but the requirement prevents the employment of graduations corresponding to small divisions of weight except upon scales of relatively small capacity in which the movement of the indicator for a given division of weight is relatively great. The invention herein disclosed makes possible the compliance with the requirements of such laws in scales of relatively great capacity.

In the form of the device shown in Figures II and III, the graduations are arcuately arranged on the fan-shaped chart $3^a$, the upper row beginning at zero with a graduation for every 100 grams; the first graduation in the second row being in the 10 gram position; the first graduation in the third row being in the 20 gram position, etc.; the first graduation in the last or lowermost row being in the 90 gram position and each graduation having a designating number. The indicator $5^a$ in this form of the device swings over the chart to a position corresponding to the weight of the load and its reading line is thus brought into registration or approximate registration with the proper graduation. The graduations in each row being 100 grams apart, the indication is very easily read. As shown in Figure III, for example, it is apparent at a glance that the indicating line falls approximately midway between 100 and 200 grams, and by following the wire downwardly until it registers with a graduation it is seen that the weight indicated is, in fact, exactly 150 grams.

In the form of device shown in Figure V, the arrangement of the graduations on the fan-shaped chart $3^b$ follows substantially the arrangement of graduations employed in the form of device shown in Figure III, but the designating numbers are applied only to the graduations in the upper row, and designating numbers for the graduations in the remaining rows are placed on the hand $5^b$, there being a number for each row. Since the values indicated by the graduations in the row immediately below the upper row are always 10 grams greater than the values of the preceding graduations in the upper row, and since the values indicated in the third row are always 20 grams greater, those in the fourth row 30 grams greater, a proper designating number may be placed on the portion of the hand which moves over each row of graduations and the designating numbers on the chart dispensed with. As shown in Figure V, it is apparent at a glance that the indicating line falls approximately midway between 100 and 200 grams, and when the line is followed downwardly it is at once seen that it registers with a graduation in the 50 gram row. The weight is therefore read as 150 grams.

In the form of the device shown in Figure VI, the graduations on the chart 3ᶜ are arranged substantially as in the form of device shown in Figure I. The designating numbers are, however, omitted from all but the left row of graduations and a designating number is placed upon the lens frame over each of the other rows. With the chart in the position shown in Figure VI, the indicating wire 5ᶜ lies between the 200 and 300 gram graduations in the left row. By following the line to the right, it will be seen that it falls between a graduation in the row numbered 70 and a graduation in the row numbered 80. The weight with the chart in this position would, therefore, be read as 275 grams.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a chart provided with a plurality of rows of widely spaced graduations, the graduations in each of the succeeding rows being progressively offset relatively to the graduations in the row immediately preceding it, and a reading index co-operating with said chart.

2. In a device of the class described, in combination, a chart provided with a plurality of rows of widely spaced graduations, the graduations in each of the succeeding rows being progressively offset relatively to the graduations in the row immediately preceding it, the distance between the adjacent graduations of each row being a multiple of the distance that the graduations are so offset, and a reading index co-operating with said chart.

3. In a device of the class described, in combination, a chart having a row of graduations corresponding to relatively large divisions of weight, a series of graduations adjacent each of the first said graduations arranged in echelon and corresponding to smaller divisions of weight, and an index co-operating with said chart.

4. In a device of the class described, in combination, a chart provided with a plurality of rows of widely spaced graduations, the graduations in each of the succeeding rows being progressively offset relatively to the graduations in the row immediately preceding it, a designating number for each graduation, and a reading index co-operating with said chart.

5. In a device of the class described, in combination, a chart having a row of graduations corresponding to relatively large divisions of weight, a series of graduations adjacent each of the first said graduations arranged in echelon and corresponding to smaller divisions of weight, each of said graduations having a designating number, and an index co-operating with said chart.

6. In a device of the class described, in combination, a housing, a cylindrical chart rotatably mounted therein, said housing having a front window through which a portion of the surface of said chart adjacent one end is visible and a rear window through which a portion of the surface of said chart adjacent the other end is visible, the portion of the chart visible through the front window bearing series of stepped graduations and the portion of the chart visible through the rear window bearing inversely arranged series of stepped graduations, each of said graduations having a designating number, and line indices visible through said windows and co-operating with said chart.

7. In a device of the class described, in combination, a cylindrical chart having a peripheral row of weight graduations corresponding to relatively large divisions of weight, certain of said graduations having designating numbers, a series of stepped graduations for each of said number-designated graduations, said stepped graduations corresponding to relatively small sub-divisions of weight, each of said stepped graduations having a designating number, and an index co-operating with said chart.

8. In a device of the class described, in combination, a housing, a rotatable cylindrical chart therein, said housing having a front window and a rear window, a portion of said chart adjacent one end being visible through said front window, said portion of said chart having a peripheral row of weight graduations corresponding to relatively large divisions of weight, certain of said graduations having designating numbers, a series of stepped graduations for each of said number-designated graduations, said stepped graduations corresponding to relatively small sub-divisions of weight, the portion of said chart visible through said rear window having inversely arranged graduations corresponding to those on the portion of said chart visible through said front window, and immovable index lines visible through said windows and co-operating with the graduations on said chart.

HENRY THEOBALD.